Feb. 23, 1960    J. W. GALLOP    2,926,279
LINEAR PARTICLE ACCELERATOR
Filed July 1, 1957    2 Sheets-Sheet 2
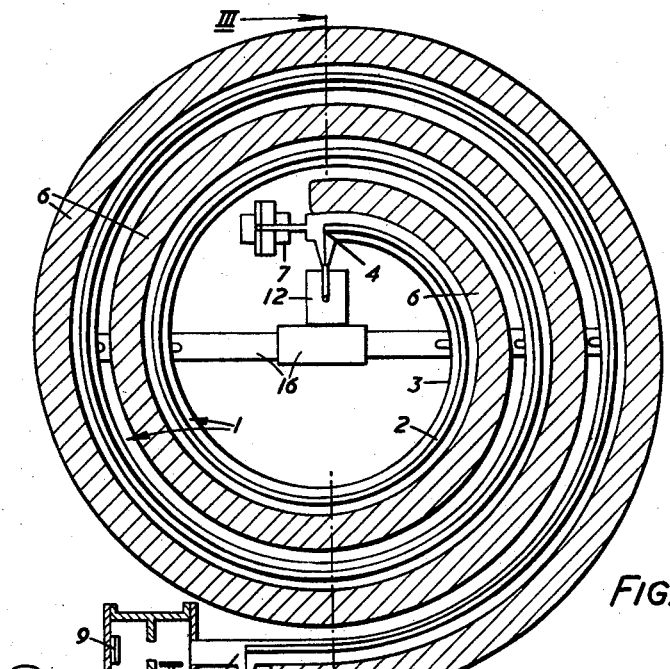
FIG. 2.
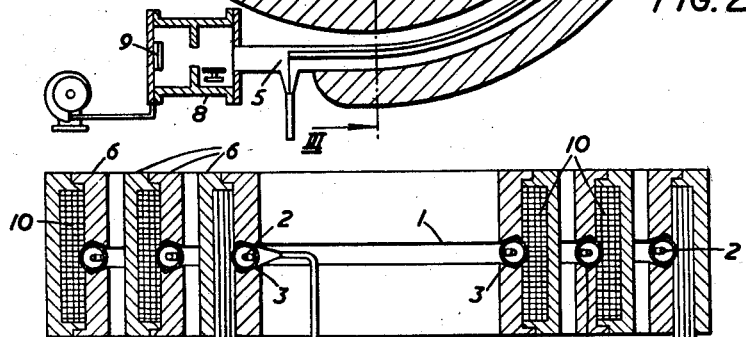
FIG. 3.
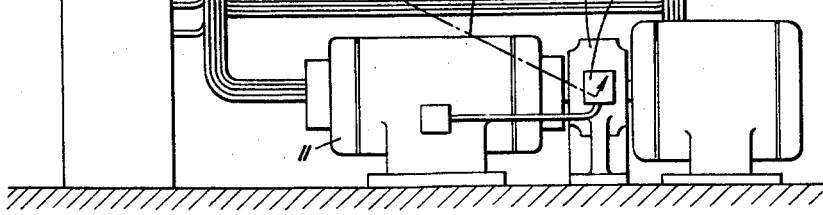
INVENTOR
John Winston Gallop
BY
Stevens, Davis, Miller & Mosher
ATTORNEYS

2,926,279

LINEAR PARTICLE ACCELERATOR

John Winston Gallop, Northwood, England, assignor to National Research Development Corporation, London, England, a corporation of Great Britain Application July 1, 1957, Serial No. 669,175

Claims priority, application Great Britain July 5, 1956

11 Claims. (Cl. 315—3.5)

This invention is a variable energy linear particle accelerator for accelerating nuclear or other atomic particles such as electrons, protons and the like by the action of a travelling electric wave established by a slow wave structure. By "slow wave structure" is meant a device to which radio frequency energy is fed so as to set up, along the axis thereof, a travelling electric field pattern the velocity of which is determinable by the physical properties of the structure.

A linear particle accelerator is defined herein as one in which a particle being accelerated does not experience the same accelerating potential across the same electrode gap more than once during its travel from injection to emission, and in which the path of the particles is closely defined by the mechanical arrangement of the slow wave structure, which is not necessarily rectilinear.

Hitherto, linear particle accelerators have been operated at a substantially constant energy level determined by their design parameters. Furthermore, the difficulties of focusing the beam in a linear accelerator have discouraged the pursuit of a design of such an accelerator in which significant variations in energy level might be achieved.

The specification of U.S. patent application Serial No. 386,995, filed October 19, 1953, however, discloses an arrangement of travelling wave linear particle accelerator in which the particles are enabled to travel in equilibrium on the trailing edge of the accelerating waveform where they are subjected to an electric focusing field. In this way, much higher beam currents can be ensured at higher energy levels than has previously been possible in travelling wave linear particle accelerators.

The above result is achieved by providing a slow wave electric accelerating field structure disposed about a curvilinear axis having a positive radius of curvature throughout its operative length, and a magnetic field system embracing, and extending uninterruptedly throughout the operative length of, the said structure, the magnetic field system being designed so that the flux vector lies transversely of the stable path of a particle being accelerated whilst the field time-invariable intensity decreases, at least over the greater part of the operative length of the slow wave structure, in the direction of deviation of a particle from the stable path as it acquires an excess of energy over that corresponding to a position on the stable path.

In the preferred embodiment of such an accelerator, the slow wave structure consists of a helix of progressively increasing pitch. In the region up to at least 20 mev. output, it can be shown that the phase velocity for such a helix is dependent on the frequency of the R.F. excitation i.e. the free-space wavelength. It can be further shown that, provided the frequency and the parameters of the helix are suitably chosen, a change of free-space wavelength by a factor of 7.5 would result in a change of output energy from 5 to 20 mev., but it is to be expected that there would be a corresponding fall in accelerating voltage gradient. Calculations show, however, that the fall in gradient with increase in free-space wavelength is not such as to constitute a serious limitation on design of a variable energy accelerator.

Consequently, the present invention is a variable energy travelling wave particle accelerator in which the frequency of the R.F. excitation of the slow wave structure is variable to give the desired energy variation, whilst the time-invariable stabilising magnetic field is correspondingly adjustable to matntain the equilibrium of the particles in a stable orbit. It is reasonable to assume that, for most practical purposes, the slow wave structure would be in the form of a helical wave-guide since this appears best adapted to proton energies in the low energy range.

In the accompanying drawings:

Figure 2 is a sectional plan of an accelerator of the kind mentioned above but modified according to the present invention so as to provide a variable energy output, and Figure 3 is a sectional elevation on the line of III—III of Figure 2.

Figure 1:
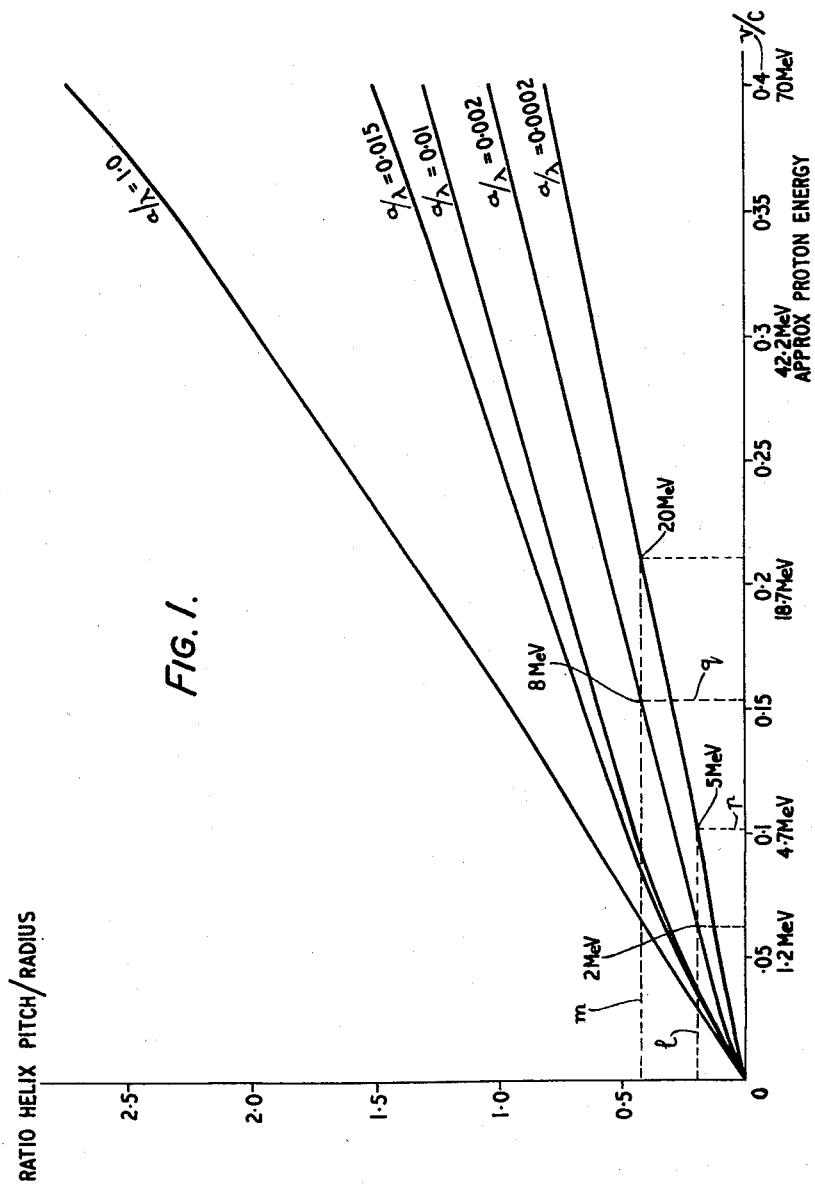
Figure 1 shows a family of curves on which the design of a suitable helical wave-guide for a given energy output may be based.

Referring to Figure 1, the curves show the relationship between the ratio of pitch to radius of the helix and the ratio of phase velocity to the velocity of light, and are calculated on the well-known sheath theory which relates helix pitch to phase velocity for a concentric conductor having a helical inner and an outer which is at infinity. In practice, a ratio of outer to inner diameters of the order of 5:1 effectively satisfies this requirement.

The curves are drawn for various values of helix radius ($a$) to free-space wavelength ($\lambda$), and the upper and lower curves represent, for all practical purposes, the envelope of the family. They are straight lines passing through the origin, and although curves for values of $a/\lambda$ below 0.0002 can be drawn, they represent conditions in which the accelerating voltage along the helix tends to disappear.

It will be noted that the intermediate curves show a progressively more marked curvature in the vicinity of the origin as the values of $a/\lambda$ increase. This means that, for a spiral accelerator of the kind referred to above, variation of output energy by a simple overall adjustment of the mean magnetic field and a corresponding adjustment of the frequency of the R.F. excitation is not strictly possible. This difficulty can, however, be overcome, for practical purposes, by one of three techniques.

The first and most obvious technique is to trim the magnetic field locally so that its strength can be varied along the length of the accelerating path. For this purpose, either local booster coils or steel shims in the magnetic circuit may be used. The latter is mechanically the less desirable.

The second technique is to straighten the curves by a variation of the diameter of the outer along the length of the accelerator. It is not practicable to alter the characteristics of the helix to meet the requirements exactly in this way but it would be possible to vary the characteristics within limits that are tolerable for any particular design.

The third technique is to adjust the characteristics of the helix either by inserting a removable dielectric material between the inner and outer conductors, or by inserting removable metal screens which would simulate the reduction of outer diameter. Such a reduction tends to increase the slopes of the curves, so that its effect is less at low values of $v/c$.

Almost all these techniques for altering the phase velocity characteristics of the helix reduce the electrical impedance of the slow wave structure. In order to improve upon this it may well prove advantageous to use a double cross-wound helix which inherently possesses a higher impedance and greater dispersion.

As has been explained above, the curves of Figure 1 have been drawn on the basis of the sheath theory. A cross-check has been made using the more exact tape theory, and reveals that, at least for the purposes of initial design, the results are sufficiently accurate.

In settling the initial design of an accelerator according to the present invention, let it be assumed that a variation in proton output energy of between 10 and 20 mev. will be required, and that the injection energy is not to exceed about 5 mev. Verticals $p, q$ are drawn on the curves of Figure 1 through the two abscissae (lower scale) representing 5 mev. and 20 mev. to intersect the lowest curve ($a/\lambda=0.0002$). Horizontals $l, m$ through these two points of intersection are produced backwards to intersect the Y-axis in the two points (approximately 0.2 and 0.4 respectively) which give the ratios of helix pitch to radius at injection and emission, respectively. The intersections by these horizontals $l, m$, of the curve $a/\lambda=0.002$ give a lower range of energy of proton acceleration of 2–8 mev.

Accelerated proton energy levels of 50 mev. or more are practicable in a machine according to the present invention.

The accompanying drawing illustrates an accelerator of the kind mentioned above but modified according to the present invention so as to provide a variable energy output.

Referring now to Figures 2 and 3 the slow wave structure 1 consists of a helical wave-guide 2 located coaxially within a tubular outer conductor 3. The pitch of the helix 2 increases progressively from the injection end 4 to the output end 5 thereof, and lies in a plane spiral between the poles of a correspondingly shaped magnet structure 6. A particle beam is injected through a beam bending magnet at 7 (Figure 2) from a particle source (not shown) and the accelerated particles emerge from the slow wave structure 1 at a termination 8 which includes, say, a target 9. The magnet 6 is energised by windings 10 from a D.C. generator 11 (Figure 3).

The helix 2 is energised from an oscillator 12 whose power output is substantially constant but whose frequency is adjustable to give the range of wavelength necsssary for the desired energy range in the emergent beam at the termination 8. Simultaneously with the adjustment of the frequency, the time invariable magnetic field across the helix 2 must be adjusted, and this is shown in Figure 3 as being effected by a gang connection 13 between the frequency control on the oscillator 12 and a rheostat 14 on the exciter 15 for the field current generator 11. The helix 2 and associated field system 6 may be divided into two or more sections having different free space wavelengths, and this technique may be adopted with particular advantage where higher energy levels are required. A vacuum connection and refrigerated baffle are indicated at 16 in Figure 2 for maintaining the necessary low pressure within the slow wave structure 1.

Cooling of the helix 2 may become a problem at higher energy levels, and it may be desirable to form the helix from a small bore tube through which water is circulated.

The above principle is clearly capable of extension to other forms of linear accelerator employing different methods of focusing than that referred to above. For example, in an accelerator using the strong focusing principle, variable energy output could be obtained by simultaneously adjusting the frequency of the R.F. excitation and the strength of the applied focusing field.

I claim:

1. A travelling wave linear particle accelerator comprising a slow wave structure; a particle injector at the input end of said structure and a particle collecting termination at the emission end thereof; means for exciting said structure with radio frequency energy; a magnet embracing said slow wave structure for producing a time-invariable particle stabilising field transversely of the axis of said structure throughout the operative length thereof; means for energising said magnet; means for adjusting the frequency of the structure exciting means; means for adjusting the output of the magnet energising means; and a gang connection between said two adjusting means for ensuring the necessary correspodence between the frequency of the excitation of said slow wave structure and the magnitude of said magnetic field to ensure the maintenance of the equilibrium of the particles in a stable orbit.

2. A travelling wave linear particle accelerator comprising a slow wave structure having a helical inner conductor lying concentrically within an outer conductor; a particle injector at the input end and a particle collecting termination at the emission end of said structure; an adjustable-frequency generator for exciting said structure with radio frequency energy; a magnet embracing said structure for producing a time-invariable particle stabilising field transversely of the axis of said structure throughout the operative length thereof; an adjustable-output D.C. generator for energising said magnet; a gang connection between said adjustable-frequency generator and said D.C. generator for ensuring that the magnitude of the magnetic field is always at the value which corresponds to stable orbit conditions for the particles for a given frequency of excitation of said slow wave structure; and means for compensating for the non-linearity of the relationship between helix pitch and phase velocity.

3. A particle accelerator according to claim 2 wherein the compensating means includes means for effecting local variation of the strength of the magnetic field along the length of the particle path.

4. A particle accelerator according to claim 3 wherein the means for effecting local variations of magnetic field strength comprises a booster coil on the magnet.

5. A particle accelerator according to claim 2 wherein the D.C. generator is separately excited, the exciter having an output regulator which is ganged to the frequency generator.

6. A travelling wave linear particle accelerator comprising a slow wave structure having a helical inner conductor lying concentrically within an outer conductor; a particle injector at the input end and a particle collecting termination at the emission end of said structure; an adjustable-frequency generator for exciting said structure with radio frequency energy; a magnet embracing said structure for producing a time-invariable particle stabilising field transversely of the axis of said structure throughout the operative length thereof; an adjustable-output D.C. generator for energising said magnet; a gang connection between said adjustable-frequency genereator and the said D.C. generator for ensuring that the magnitude of the magnetic field is always at the value which corresponds to stable orbit conditions for the particles for a given frequency of excitation of said slow wave structure; and magnetic shims for insertion into the magnetic circuit to compensate for non-linearity of the relationship between helix pitch and phase velocity 7. A particle accelerator according to claim 2 wherein the helical conductor is double cross-wound.

8. A travelling wave linear particle accelerator comprising a slow wave structure; having a helical inner conductor lying concentrically within an outer conductor; a particle injector at the input end and a particle collecting termination at the emission end of said structure; an adjustable frequency generator for exciting said structure with radio frequency energy; a magnet embracing said structure for producing a time-invariable particle stabilising field transversely of the axis of said structure throughout the operative length thereof; an adjustable-output D.C. generator for energising said magnet; a gang connection between said adjustable-frequency generator and said D.C. generator for ensuring that the magnitude of the magnetic field is always at the value which corresponds to stable orbit conditions for the particles for a given frequency of excitation of said slow wave structure; and a removable insert between the helical inner and the outer conductors of the slow wave structure.

9. A variable energy travelling wave linear particle accelerator comprising a slow wave structure; an R.F. generator connected to said structure; a particle injection connection at the injection end thereof; a particle collecting termination at the emission end; a D.C. magnet embracing said slow wave structure for producing a transverse time-invariable stabilising magnetic field; means for adjusting the frequency output of the R.F. generator; means for correspondingly adjusting the time-invariable stabilising field; and a gang connection between the frequency and field adjusting means.

10. A variabe energy travelling wave linear particle accelerator comprising a slow wave structure having concentric outer and inner conductors, the latter being constituted by a helix of increasing pitch from the particle injection to the particle emission end; a variable frequency R.F. generator coupled to the said structure; means for injecting a beam of particles to be accelerated into the slow wave structure; a particle collecting termination at the emission end of said structure; a D.C. magnet embracing said structure for producing a transverse particle stabilising field extending throughout the length of the slow wave structure; a variable output generator for exciting the D.C. magnet; and a gang connection between the R.F. and D.C. generators for ensuring correct correspondence between their respective outputs.

11. A variabe energy travelling wave linear particle accelerator comprising a slow wave structure having a curvilinear axis of smoothly increasing radius from its injection to its emission end and consisting of an inner helical conductor of progressively increasing pitch and an outer conductor whose diameter decreases in such a manner as to compensate for the non-linearity of the pitch/phase velocity characteristic; a D.C. magnet embracing the structure continuously from the injection to the emission end and providing a transverse stabilising magnetic field which is substantially at right angles to the plane of the said curvilinear axis; an R.F. generator having a variable frequency output for exciting the slow wave structure; a variable output D.C. generator for energising the D.C. magnet; and a gang connection between the output controls of the R.F. and D.C. generators for maintaining a predetermined relationship between the respective outputs so as to ensure stable conditions throughout the particle path.

References Cited in the file of this patent

UNITED STATES PATENTS

| | | |
|---|---|---|
| 2,524,252 | Brown | Oct. 3, 1950 |
| 2,617,961 | Bruck | Nov. 11, 1952 |
| 2,683,216 | Wideroe | July 6, 1954 |
| 2,715,697 | Webber | Aug. 16, 1955 |
| 2,752,523 | Goodall | June 26, 1956 |
| 2,812,463 | Teng et al. | Nov. 5, 1957 |
| 2,829,300 | Wilson | Apr. 1, 1958 |